United States Patent [19]

Iimura et al.

[11] Patent Number: 4,873,479
[45] Date of Patent: Oct. 10, 1989

[54] BATTERY CHARGER
[75] Inventors: Yoshio Iimura, Mito; Kazuyuki Nagahara, Katsuta, both of Japan
[73] Assignee: Hitachi Koki Company, Ltd., Tokyo, Japan
[21] Appl. No.: 246,712
[22] Filed: Sep. 20, 1988
[30] Foreign Application Priority Data Sep. 25, 1987 [JP] Japan .................. 62-146944[U]

[51] Int. Cl.$^4$ .................. H01M 10/46; H02J 7/00
[52] U.S. Cl. ............................ 320/2; 320/15; 455/89
[58] Field of Search ............ 320/2, 15; 455/89

[56] References Cited

U.S. PATENT DOCUMENTS

| | | | |
|---|---|---|---|
| 4,214,197 | 7/1980 | Mann et al. | 455/89 X |
| 4,403,182 | 9/1983 | Yeh | 320/2 |
| 4,558,270 | 12/1985 | Liautaud et al. | 320/2 |
| 4,766,361 | 8/1988 | Pusateri | 320/2 |

OTHER PUBLICATIONS

Craig M1001 Translator and Information Center Owner's Reference Manual, 1979, pp. 1,5.

Primary Examiner—R. J. Hickey
Attorney, Agent, or Firm—Pollock, VandeSande & Priddy

[57] ABSTRACT

A battery charger has a recess for accommodating a battery pack, and charging electrodes projecting into the recess. The battery pack is charged when the battery pack is inserted into the recess and battery electrodes of the battery pack are brought into contact with the charging electrodes. In an improvement of the battery charger, the recess has portions of different shapes corresponding to respective shapes of a plurality of different battery packs for accommodating the different battery packs, and the charging electrodes have portions projecting into the recess portions respectively.

6 Claims, 1 Drawing Sheet

BATTERY CHARGER

BACKGROUND OF THE INVENTION

1. Field of the Invention

This invention relates to a battery charger.

2. Description of the Prior Art

Recently, battery-powered tools and implements have been widely used. In general, various battery packs are used in different tools and implements.

Some battery chargers are usable for battery packs of different shapes. In one example of such battery chargers, a charge control section is of a universal type usable for various battery packs independent of battery voltages and battery capacities, and a body has a plurality of battery accommodating recesses of different shapes corresponding to the respective shapes of the battery packs. A plurality of battery accommodating recesses tend to require a large body. In another example, a body has a single battery accommodating recess and a plurality of adapters are prepared for matching different battery packs to the recess. A plurality of adapters tend to cause the use of the battery charger to be complicated.

SUMMARY OF THE INVENTION

It is an object of this invention to provide a compact and easily usable battery charger.

In accordance with a first aspect of this invention, a battery charger has a recess for accommodating a battery pack, and charging electrodes projecting into the recess. The battery pack is charged when the battery pack is inserted into the recess and battery electrodes of the battery pack are brought into contact with the charging electrodes. In an improvement of the battery charger, the recess has portions of different shapes corresponding to respective shapes of a plurality of different battery packs for accommodating the different battery packs, and the charging electrodes have portions projecting into the recess portions respectively.

In accordance with a second aspect of this invention, a battery charger has a recess for accommodating a battery pack, and charging electrodes projecting into the recess. The battery pack is charged when the battery pack is inserted into the recess and battery electrodes of the battery pack are brought into contact with the charging electrodes. In an improvement of the battery charger, the recess has a stepped structure and has portions divided by a step, and the recess portions have different shapes corresponding to respective shapes of a plurality of different battery packs for accommodating the different battery packs. The charging electrodes have portions projecting into the recess portions respectively.

In accordance with a third aspect of this invention, a battery charger includes a body and charging electrodes. The body is formed with a recess having first and second portions. The first and second recess portions have shapes corresponding to at least parts of different shapes of first and second battery packs for, accommodating at least parts of the first and second battery packs respectively. The charging electrodes project into the first and second recess portions. The charging electrodes contact battery electrodes of the first battery pack when the first battery pack is inserted into the first recess portion. The charging electrodes contact battery electrodes of the second battery pack when the second battery pack is inserted into the second recess portion.

DESCRIPTION OF THE PREFERRED EMBODIMENT

Figure 1:
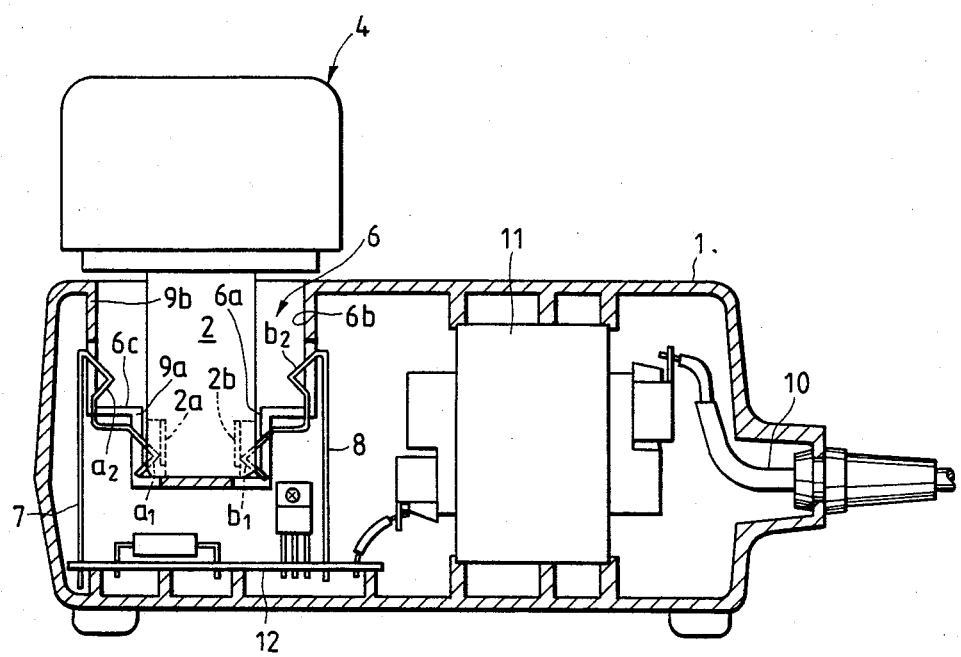
FIG. 1 is a sectional view of a battery charger, according to an embodiment of this invention, and a battery pack inserted into the battery charger.
Figure 2:
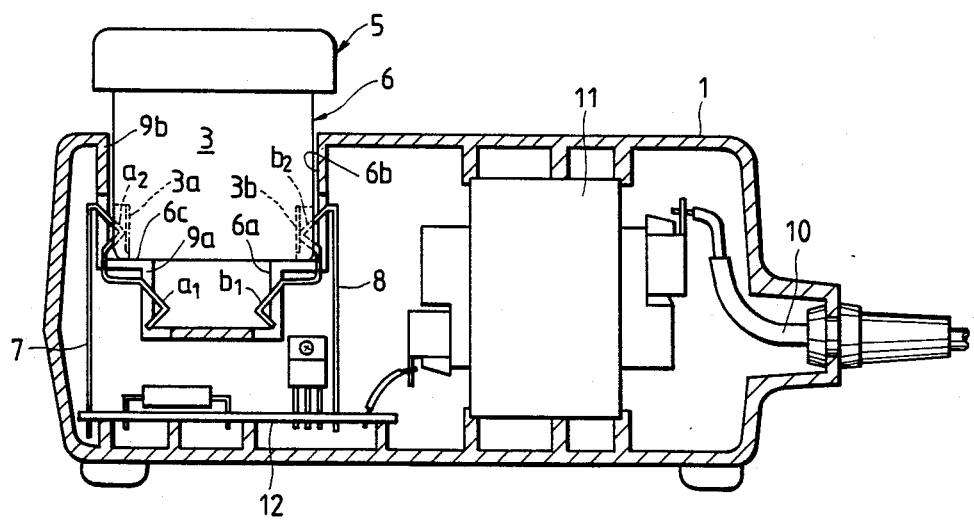
FIG. 2 is a sectional view of the battery charger and another battery pack inserted into the battery charger.

With reference to FIGS. 1 and 2, a battery charger has a body or casing 1 formed with a battery accommodating recess 6. The recess 6 is of a stepped shape, having a narrow portion 6a and a wide portion 6b extending below and above a step 6c respectively. In correspondence with the stepped shape of the recess 6, the walls of the casing 1 which define sides of the recess 6 have a step corresponding to the step 6c. The walls 9a of the casing 1 which extend below the step 6c define a bottom and sides of the narrow recess portion 6a. The walls 9b of the casing 1 which extend above the step 6c define sides of the wide recess portion 6b. The walls of the casing which correspond to the step 6c define a bottom of the wide recess portion 6b.

The narrow recess portion 6a substantially conforms to a lower portion 2 of a battery pack 4 to snugly accommodate the latter. When the lower portion 2 of the battery pack 4 is inserted into the narrow recess portion 6a and is placed in position with respect to the battery charger, the lower portion 2 of the battery pack 4 is in contact with the walls of the casing 1 which define the bottom of the narrow recess portion 6a. The wide recess portion 6b substantially conforms to a lower portion 3 of another battery pack 5 to snugly accommodate the latter. When the lower portion 3 of the battery pack 5 is inserted into the wide recess portion 6b and is placed in position with respect to the battery charger, the lower portion 3 of the battery pack 5 is in contact with the walls of the casing 1 which define the step 6c.

The voltage of the battery pack 4 is higher than the voltage of the battery pack 5. The capacity of the battery pack 4 is greater than the capacity of the battery pack 5. The lower portion 2 of the battery pack 4 is narrower than the lower portion 3 of the battery pack 5. The lower portion 2 of the battery pack 4 is provided with a pair of electrode terminals 2a and 2b. The lower portion 2 of the battery pack 4 thus forms a support for the electrode terminals 2a and 2b. Similarly, the lower portion 3 of the battery pack 5 is provided with a pair of electrode terminals 3a and 3b. The lower portion 3 of the battery pack 5 forms a support for the electrode terminals 3a and 3b.

An ac cord 10 extends into the casing 1 and electrically connects with a transformer 11 supported within the casing 1. A known circuit including a rectifying section and a charging current control section is electrically connected to the transformer 11 and is assembled on a board 12 supported within the casing 1. The charging current control section is of a known universal type usable for the different battery packs 4 and 5 regardless of the different voltages and capacities thereof.

A pair of charging electrode strips 7 and 8 are supported on the board 12 and are electrically connected to the circuit on the board 12. As will be made clear hereinafter, a charging current is supplied to the battery pack 4 or 5 via the charging electrode strips 7 and 8.

The charging current is controlled by the circuit on the board 12.

The charging electrode strip 7 has V-shaped contact portions a1 and a2 projecting into the narrow recess portion 6a and the wide recess portion 6b respectively. Similarly, the charging electrode strip 8 has V-shaped contact portions b1 and b2 projecting into the narrow recess portion 6a and the wide recess portion 6b respectively. The contact portion a1 opposes the contact portion b1. The contact portion a2 opposes the contact portion b2.

When the lower portion 2 of the battery pack 4 is inserted into the narrow recess portion 6a and is placed in position with respect to the battery charger, the charging electrode contact portions a1 and b1 are in contact with the battery electrode terminals 2a and 2b respectively so that a charging current is allowed to pass through the battery pack 4. When the lower portion 3 of the battery pack 5 is inserted into the wide recess portion 6b and is placed in position with respect to the battery charger, the charging electrode contact portions a2 and b2 are in contact with the battery electrode terminals 3a and 3b respectively so that a charging current is allowed to pass through the battery pack 5.

It should be noted that various modifications may be made in the embodiment of this invention. In a first modification, the charging electrode strips 7 and 8 are directly supported by the casing 1 and are electrically connected to the circuit on the board 12 via leads. In a second modification, two pairs of charging electrode strips are prepared for the respective battery packs 4 and 5. In a third modification, the casing 1 has a plurality of battery accommodating recesses having stepped structures.

What is claimed is:

1. A battery charger comprising:
    a body having a recess and a step, the recess having first and second portions divided by the step, the first and second recess portions having shapes corresponding to at least parts of different shapes of first and second battery packs for accommodating at least parts of the first and second battery packs respectively, the first portion extending above the second portion as viewed in a direction along a depth of he recess, the first portion is wider than the second portion; and
    charging electrodes extending in a direction along the depth of the recess and having first and second projections, the first projections extending into the first recess portion, the second projections extending into the second recess portion, wherein the charging electrode first projections contact battery electrodes of the first battery pack when the first battery pack is inserted into the first recess portion, and wherein the charging electrode second projections contact battery electrodes of the second battery pack when the second battery pack is inserted into the second recess portion.

2. The battery charger of claim 1 wherein the recess has a stepped structure including a step, and the first and second recess portions are divided by the step.

3. A battery charger comprising:
    a body having a recess, the recess narrowing stepwise in a direction along a depth of the recess toward a bottom of the recess, the recess having a plurality of portions in correspondence with the stepwise narrowing, the recess portions having shapes corresponding to at least parts of different shapes of battery packs for accommodating at least parts of the battery packs respectively; and
    charging electrodes having main portions and contact portions, the main portions extending parallel to a direction of the depth of the recess, the contact portions projecting from the main portions into the recess portions through walls of the body.

4. The battery charger of claim 3 wherein the body has a flat portion extending along a boundary between the recess portions, the flat portion contacting and supporting a corresponding flat surface of one of the battery packs when the battery pack is inserted into the recess.

5. The battery charger of claim 3 wherein the body has a flat portion defining the bottom of the recess and contacting and supporting a corresponding flat end face of one of the battery packs when the battery pack is inserted into the recess.

6. The battery charger of claim 3 wherein the recess is open only at the top and has a bottom connected to vertically extending sidewalls forming an enclosure.

* * * * *